US012772336B2

United States Patent
Chopade et al.

(10) Patent No.: US 12,772,336 B2
(45) Date of Patent: Oct. 20, 2026

(54) TIME-LIMITED WIRELESS ACCESS POINT CONNECTIVITY TO LIMITED DESTINATIONS IN RESPONSE TO LIMITED CELLULAR SERVICE

(71) Applicant: Charter Communications Operating, LLC, St. Louis, MO (US)

(72) Inventors: Vishal Chopade, Castle Pines, CO (US); Mohamed Daoud, Aurora, CO (US); Hany Heikal, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 180 days.

(21) Appl. No.: 18/756,878

(22) Filed: Jun. 27, 2024

(65) Prior Publication Data

US 2026/0006681 A1 Jan. 1, 2026

(51) Int. Cl.
*H04W 76/34* (2018.01)
*H04W 12/069* (2021.01)

(52) U.S. Cl.
CPC ......... *H04W 76/34* (2018.02); *H04W 12/069* (2021.01)

(58) Field of Classification Search
CPC ............................ H04W 76/34; H04W 12/069
See application file for complete search history.

(56) References Cited

U.S. PATENT DOCUMENTS

2007/0022469 A1 * 1/2007 Cooper ................ H04L 9/3247 726/3

* cited by examiner

*Primary Examiner* — Curtis B Odom
(74) *Attorney, Agent, or Firm* — Dority & Manning, P.A.

(57) ABSTRACT

A wireless access point (AP) receives a certificate from an application executing on a computing device that has not connected to the wireless AP, wherein the certificate does not include a password to a service set identifier (SSID) that is broadcast by the wireless AP. The wireless AP determines that the certificate is associated with an entity that is an authorized entity. In response to determining, that the certificate is associated with the entity that is the authorized entity, the wireless AP establishes a time-limited connection with the computing device.

23 Claims, 9 Drawing Sheets

TIME-LIMITED WIRELESS ACCESS POINT CONNECTIVITY TO LIMITED DESTINATIONS IN RESPONSE TO LIMITED CELLULAR SERVICE

BACKGROUND

Large service providers often install wireless access points (APs) throughout a large geographic area, such as throughout a country, that customers can utilize for free or inexpensively as a perquisite for being a customer.

SUMMARY

The examples disclosed herein implement time-limited wireless access point connectivity to limited destinations in response to limited cellular service.

In one example a method is provided. The method includes receiving, by a wireless access point (AP), a certificate from an application executing on a computing device that has not connected to the wireless AP, wherein the certificate does not include a password to a service set identifier (SSID) that is broadcast by the wireless AP. The method further includes determining, by the wireless AP, that the certificate is associated with an entity that is an authorized entity. The method further includes, in response to determining, by the wireless AP, that the certificate is associated with the entity that is the authorized entity, establishing, by the wireless AP, a time-limited connection with the computing device.

In another example another method is provided. The method includes receiving, by an application executing on a computing device, a network service set identifier (SSID) that is being broadcast by a wireless access point (AP). The method further includes determining, by the application, that the network SSID matches a predetermined SSID stored in the computing device. The method further includes determining, by the application, that a strength of a cellular connection of the computing device is below a predetermined threshold. The method further includes in response to determining that the strength of the cellular connection of the computing device is below the predetermined threshold, accessing by the application, a certificate. The method further includes sending, by the application to the wireless AP, information including the certificate, the information lacking a password associated with the network SSID.

In another example a wireless access point is provided. The wireless access point includes a memory, and a processor device coupled to the memory. The processor device is further operable to receive a certificate from an application executing on a computing device that has not connected to the wireless AP, wherein the certificate does not include a password to a service set identifier (SSID) that is broadcast by the wireless AP. The processor device is further operable to determine that the certificate is associated with an entity that is an authorized entity. The processor device is further operable to, in response to determining that the certificate is associated with the entity that is the authorized entity, establish a time-limited connection with the computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
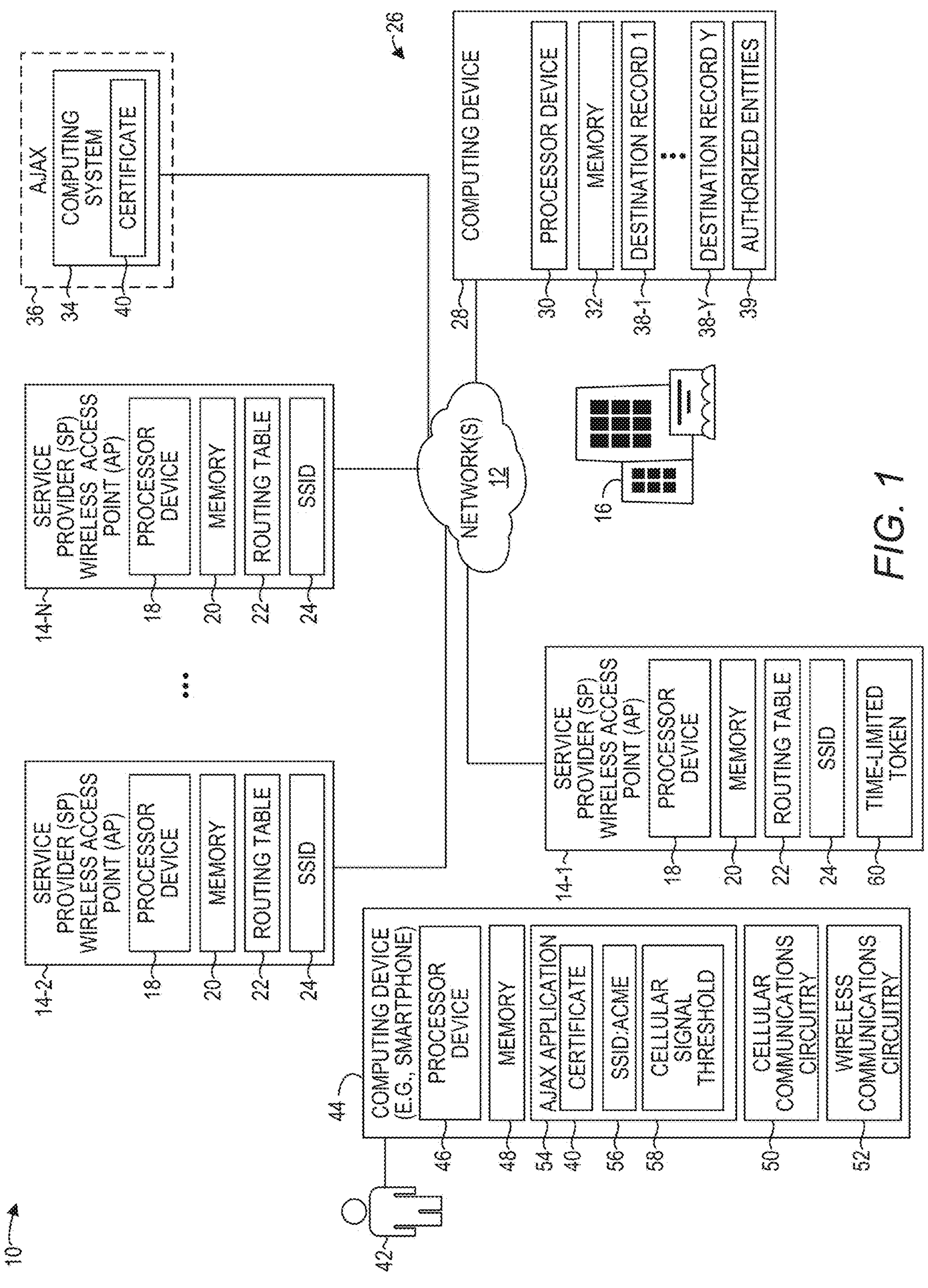
FIG. 1 is a block diagram of an environment suitable for implementing time-limited wireless access point (AP) connectivity to limited destinations in response to limited cellular service according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A service provider may install wireless access points (APs) throughout a large geographic area, such as throughout a city, a state, or a country, that customers can utilize for free or inexpensively as a perquisite for being a customer. The term "wireless access point" or "access point" as used herein refers to the use of wireless signals and protocols that are based on an IEEE 802.11x standard, such as, for example Wi-Fi®.

There are times when an individual using a mobile computing device, such as a smartphone, requires Internet access at a location that has poor or no cellular service. Such locations may be within wireless range of a service provider's wireless AP and the user's computing device may even present the service provider's service set identifier (SSID) on a display device of the computing device to offer the user the opportunity to connect to the wireless AP. However, unless the individual is a customer of the service provider, the individual typically has no means to connect to the wireless AP without a password.

As an example, an individual may arrive at a rental property that is located in an area with no, or poor, cellular service, such as a mountainous area. As the individual approaches the rental property, the individual may need to access information that is accessible via an application on the individual's phone, such as a combination to a lock that prevents entry to the rental property. The individual initiates the application but due to poor cellular service the application cannot contact the remote server where such information is stored. The individual is presented with a network SSID that indicates a wireless AP is within range, however, the individual lacks the password and thus cannot connect to the wireless AP.

The examples disclosed herein implement time-limited wireless access point connectivity to limited destinations in response to limited cellular service. The examples include a pre-registration stage wherein an entity that operates a remote computing device that interoperates with a user computing device pre-registers with a service provider. The entity is provided one or more certificates that, if presented by a user computing device to a wireless AP of the service provider, will allow the user computing device to access the remote computing device of the entity, but not other destinations, for a limited period of time.

FIG. 1 is a block diagram of an environment 10 suitable for implementing time-limited wireless access point connectivity to limited destinations in response to limited cellular service according to some implementations. The environment 10 incudes one or more networks 12 via which a plurality of computing devices can communicate with one another. The environment 10 includes one or more wireless access points (APs) (hereinafter "AP" or "APs" for the sake of brevity) 14-1-14-N (generally, APs 14) that are operable to provide, via the networks 12, Internet access to computing devices that are capable of connecting to the APs 14. The number of APs 14 may be one, tens, hundreds, or thousands. The APs 14 may be operated by a service provider 16 that provides Internet access to customers over a large geographic region.

The AP 14-1 includes a processor device 18 and a memory 20. The AP 14-1 may be, or may be connected to, a gateway router that uses a routing table 22 to implement layer 3 (e.g., TCP/IP) gateway routing functionality for computing devices connected to the AP 14-1. The AP 14-1 implements a wireless network having a service set identifier (SSID, e.g. network name) 24 (in this example "ACME") and relatively continuously broadcasts the SSID 24 to inform computing devices within range of the AP 14-1 of the availability of the ACME network via the AP 14-1. In some implementations, computing devices provided by the service provider 16 to customers may be pre-configured to be able to join the AP 14-1 without user entry of a password or other authentication information as a perquisite for being a customer of the service provider 16. Such pre-configuration may comprise setting up an appropriate network configuration on the user computing device automatically by the service provider 16 such that the user computing device provides sufficient authentication information to the AP 14-1 automatically without user input. Conventionally, a computing device that has not been so configured, may not be able to connection to the AP 14-1 under any circumstances, or, may be required to provide authentication credentials, such as a password associated with the SSID 24, in order to connect to the AP 14-1. The APs 14-2-14-N may be configured substantially similar to or identical to the AP 14-1, and may operate substantially similar to or identical to the AP 14-1 as will be described herein. The APs 14-2-14-N may also relatively continuously broadcast the SSID 24.

The environment 10 includes a computing system 26 that includes one or more computing device 28. For purposes of illustration only a single computing device 28 is illustrated, however, in practice the functionality attributed herein to the computing device 28 or to the computing system 26 may be implemented by any number of computing devices 28. The computing device 28 includes a processor device 30 and a memory 32.

The environment 10 includes a computing system 34 associated with an entity 36, such as, by way of non-limiting example, a company. The computing system 34 may comprise any number of computing devices, and may be accessible via the network 12 via a particular domain name or IP address(es).

With this background, an example of implementing time-limited wireless access point connectivity to limited destinations in response to limited cellular service will be discussed. The entity 36 interacts with the service provider 16 to pre-register for a service wherein users of an application of the entity 36 will be able to connect to the APs 14 operated by the service provider 16 even if such users are not customers of the service provider 16. The pre-registration involves storing a destination record 38-1 in the computing system 26 that identifies permissible destination information, such as, by way of non-limiting example, one or more domain names or IP addresses used by the computing system 34. The service provider 16 may offer this service to any number of entities and store a plurality of destination records 38-1-38-Y (generally, destination records 38) in the computing system 34, each destination record 38 identifying one or more permissible destinations that correspond to a particular entity. The computing system 26 may also add an entity identifier that identifies the entity 36 to a list 39 of authorized entities.

The service provider 16 provides, directly or indirectly, a digital certificate 40 to the entity 36 that, if presented by a computing device to an AP 14, will allow the computing device to connect to the AP 14 for a limited amount of time.

The computing device will be able to communicate, via the AP 14, only with the computing system 34 during such limited period of time.

A user 42 operates a computing device 44 that is operable to communicate via cellular signals that comply with a cellular communications standard, and via wireless signals that comply with, for example, an IEEE 802.11x standard. The computing device 44 may comprise, by way of non-limiting example, a smart phone, a laptop computing device, a computing tablet, or the like. The computing device 44 includes a processor device 46 and a memory 48. The computing device 44 includes cellular communications circuitry 50 that is operable to communicate via cellular signals, such as, by way of non-limiting example, 3G, 4G or 5G cellular signals, and wireless communications circuitry 52 that is operable to communicate via wireless signals, such as those compliant with an IEEE 802.11x standard (e.g., Wi-Fi®).

The user 42 downloads onto the computing device 44 an Ajax application 54 that interoperates with the computing system 34 to provide some service to the user 42. In this example the Ajax application 54 implements a rental property service, however, the examples disclosed herein are not limited to any particular service. The user 42 is not a customer of the service provider 16 and thus the computing device 44 has not been preconfigured to communicate with an AP 14 associated with the service provider 16.

The Ajax application 54 may, for example, be downloaded via an application store, such as the Apple® or Google® application stores. The Ajax application 54 includes a copy of the certificate 40 provided by the service provider 16 to the entity 36, and includes a predetermined SSID 56 that will match the SSID 24. If the Ajax application 54 had been downloaded prior to registration with the service provider 16, the Ajax application 54 would cause an update of the Ajax application 54 on the computing device 44, and by virtue of the update would have the certificate 40 and the predetermined SSID 56.

The user 42 is in proximity of a rental property and initiates the Ajax application 54 in order to obtain information necessary to enter the rental property. The user 42 is also within range of the AP 14-1. The Ajax application 54 receives the network SSID 24 that is broadcast from the AP 14-1. The Ajax application 54 determines that the network SSID 24 matches the predetermined SSID 56 stored in the computing device 44 and thus, if necessary, the Ajax application 54 can establish a connection with the AP 14-1. In some implementations, establishing the connection with the AP 14-1 may be less desirable than using cellular service when available due to fees associated with use of the AP 14-1, or for other reasons.

The Ajax application 54 determines that a strength of a cellular connection of the computing device 44 is below a predetermined threshold 58. The threshold 58 may quantify the cellular signal strength using any suitable metric, such as, by way of non-limiting example, Received Signal Strength Indicator (RSSI), decibels, or the like. It is noted that the lack of any cellular signal would constitute a strength less than the predetermined threshold 58.

In response to determining that the strength of the cellular connection is below the predetermined threshold 58, the Ajax application 54 determines to connect with the AP 14-1, and accesses the certificate 40. The Ajax application 54 sends to the AP 14-1 information including the certificate 40. The information does not include a password associated with the SSID 24.

The AP 14-1 receives the certificate 40 from the Ajax application 54. The AP 14-1 determines that the certificate 40 is associated with an authorized destination, in this case, a permissible destination identified in the destination record 38-1. In response, the AP 14-1 establishes a time-limited connection with the computing device 44, and informs the Ajax application 54 or the computing device 44 that a connection has been established with the computing device 44. Policies associated with the time-limited connection, such as the length of time and a list of one or more authorized destinations may be maintained in a token 60 generated by the AP 14-1 or obtained from the computing system 26. For the duration of the time-limited connection the AP 14-1 will allow the Ajax application 54 to communicate with the authorized destination. At the end of the period of time, the AP 14-1 will terminate the connection.

The user 42 interacts with the Ajax application 54 to obtain the necessary information from the computing system 34 to allow the user 42 to gain entry to the rental property. The AP 14-1 subsequently determines that the period of time of the time-limited connection has expired, and the AP 14-1 terminates the connection with the computing device 44.

It is noted that, because the Ajax application 54 is a component of the computing device 44, functionality implemented by the Ajax application 54 may be attributed to the computing device 44 generally. Moreover, in examples where the Ajax application 54 comprises software instructions that program the processor device 46 to carry out functionality discussed herein, functionality implemented by the Ajax application 54 may be attributed herein to the processor device 46.

It is further noted that functionality described herein with regard to the AP 14-1 may be implemented by suitable executable instructions executed by the processor device 18 and thus functionality attributed herein to the AP 14-1 may also be attributed to the processor device 18.

Figure 2:
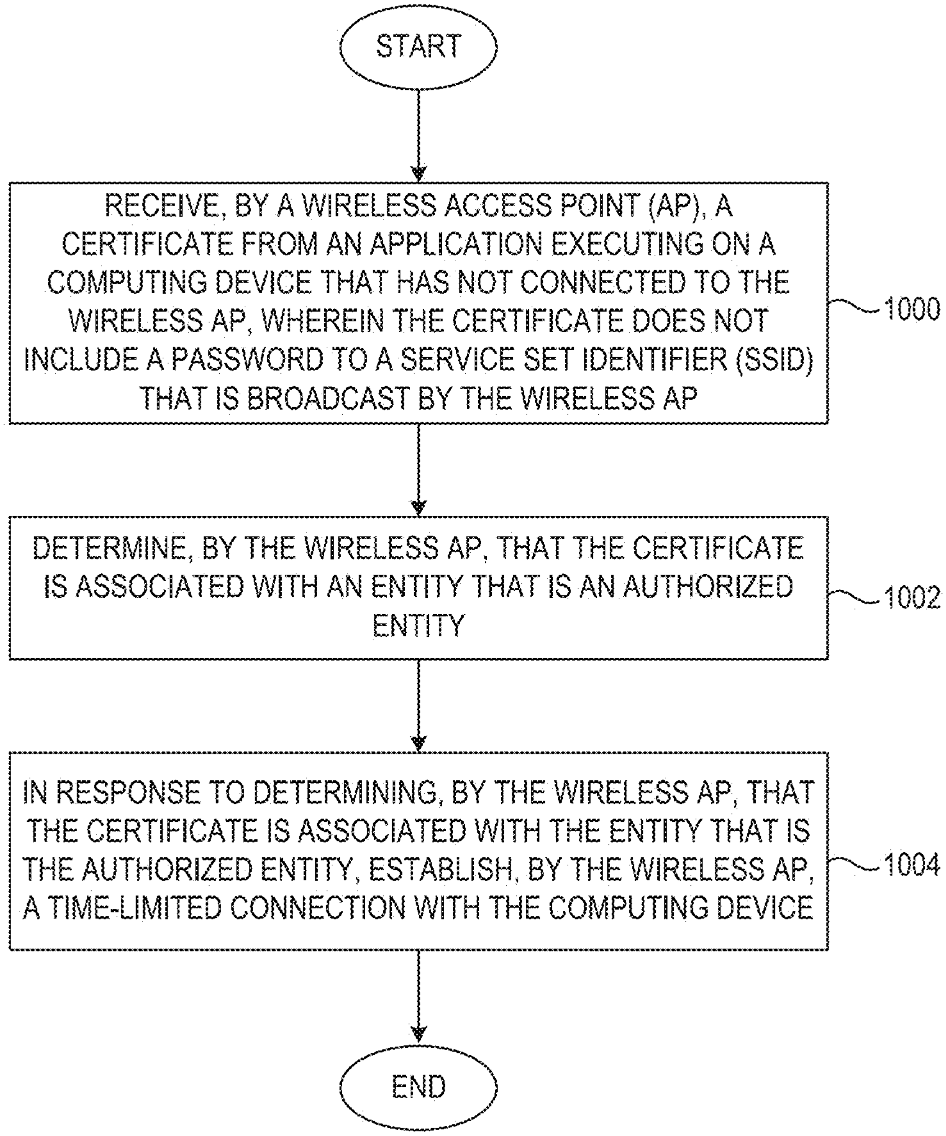
FIG. 2 is a flowchart of a method for implementing time-limited wireless access point connectivity to limited destinations in response to limited cellular service from the perspective of a wireless AP according to some implementations.

FIG. 2 is a flowchart of a method for implementing time-limited wireless access point connectivity to limited destinations in response to limited cellular service from the perspective of the AP 14-1 according to some implementations. FIG. 2 will be discussed in conjunction with FIG. 1. The wireless AP 14-1 receives the certificate 40 from the Ajax application 54 executing on the computing device 44 that has not connected to the wireless AP 14-1, wherein the certificate 40 does not include a password to the SSID 24 that is broadcast by the wireless AP 14-1 (FIG. 2, block 1000). The phrase "not connected" in this context means the wireless AP 14-1 has not yet determined to facilitate communications with the computing device 44 and other devices, such as devices associated with the Internet, and/or has not yet set up the requisite data structures that are set up when a computing device successfully authenticates with the AP 14-1. The wireless AP 14-1 determines that the certificate 40 is associated with an entity that is an authorized entity (FIG. 2, block 1002). In response to determining, by the wireless AP 14-1, that the certificate 40 is associated with the entity that is the authorized entity, the wireless AP 14-1 establishes a time-limited connection with the computing device 44 (FIG. 2, block 1004).

Figure 3A:
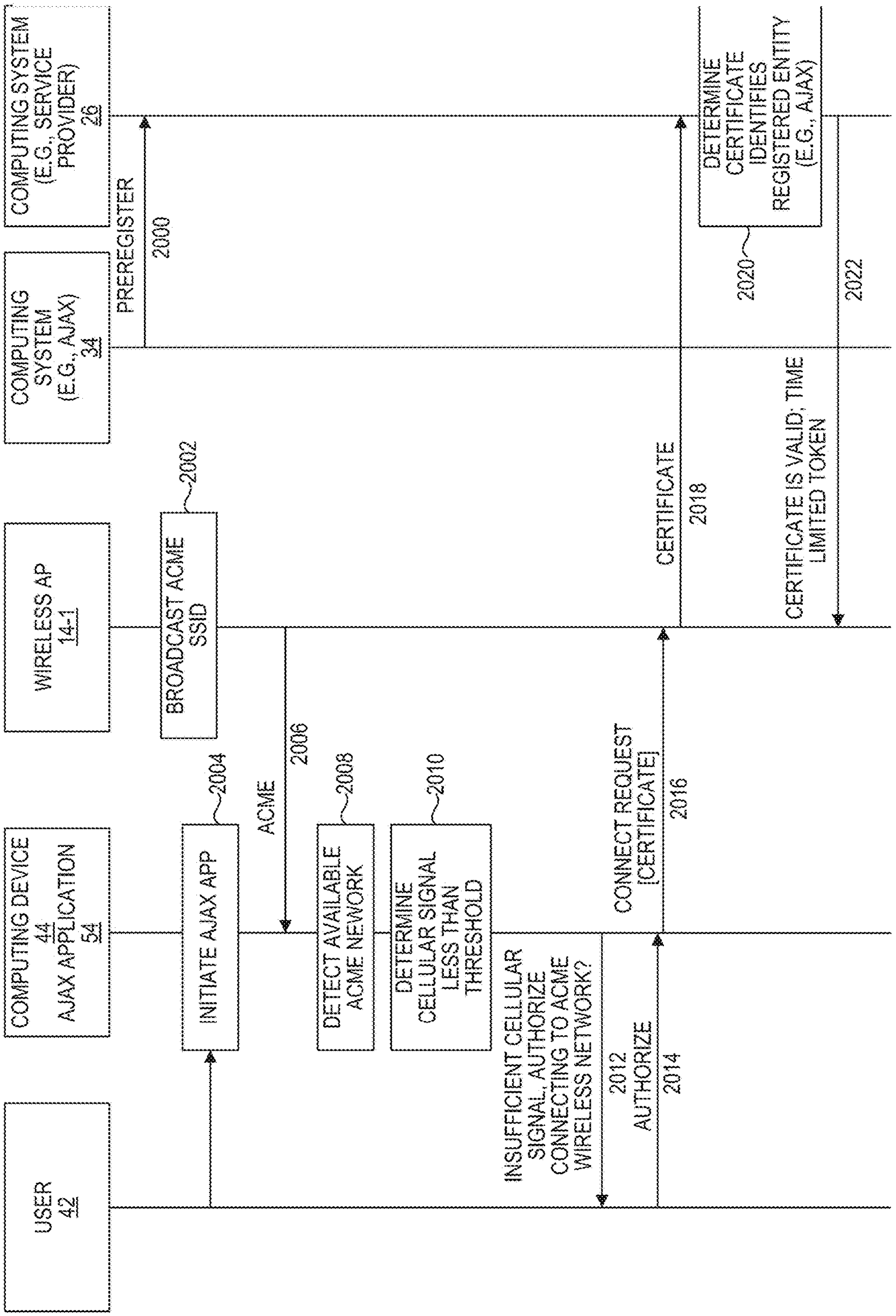
FIGS. 3A-3B are a sequence diagram illustrating messages communicated between and actions taken by components illustrated in FIG. 1 to implement time-limited wireless access point connectivity to limited destinations in response to limited cellular service according to some implementations.
Figure 3B:
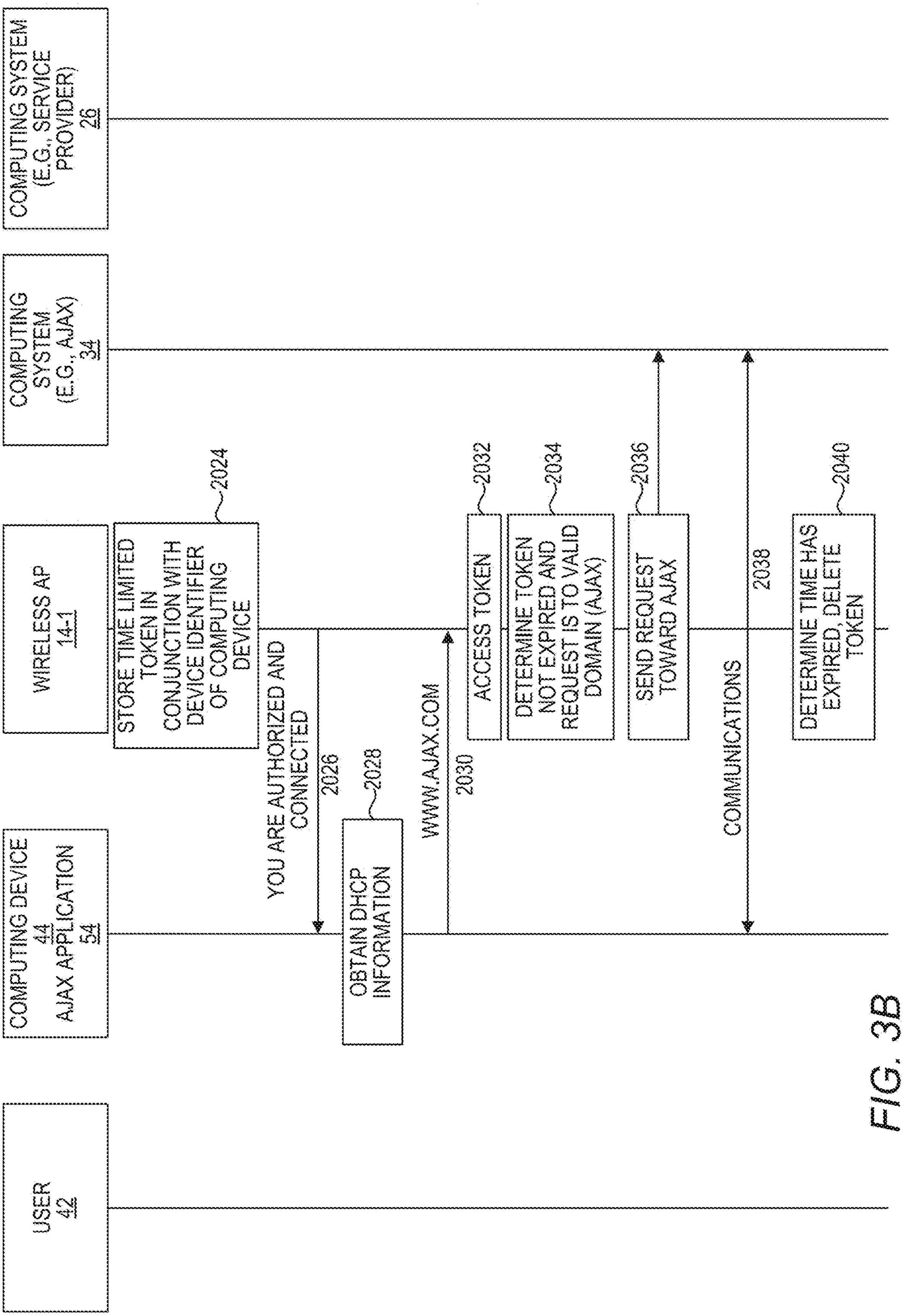

FIGS. 3A-3B are a sequence diagram illustrating messages communicated between and actions taken by components illustrated in FIG. 1 to implement time-limited wireless access point connectivity to limited destinations in response to limited cellular service according to some implementations. Referring first to FIG. 3A, the entity 36 preregisters with the service provider 16, which results in information being stored in the list 39 of authorized entities that identifies the entity 36 as a registered (e.g., authorized) entity and results in the generation of the destination record 38 that identifies permissible (e.g., authorized) locations that the Ajax application 54 can communicate with via an AP 14 (step 2000).

The wireless AP 14-1 relatively continuously broadcasts the SSID 24 (step 2002). The user 42 initiates the Ajax application 54 on the computing device 44 (step 2004). The Ajax application 54 receives the SSID 24 and compares the SSID 24 to the predetermined SSID 56 (step 2006). The Ajax application 54 determines that the SSID 24 and the predetermined SSID 56 match, and therefore determines that the ACME network is available, if needed (step 2008). The Ajax application 54 determines that cellular signal strength is less than the predetermined threshold 58 (step 2010).

The Ajax application 54 presents, on a display device of the computing device 44, a request for authorization to connect to the AP 14-1 (step 2012). The Ajax application 54 receives user input from the user 42 that authorizes connection to the AP 14-1 (step 2014). The Ajax application 54 accesses the certificate 40, and sends the certificate 40 to the AP 14-1 (step 2016). In some implementations, the certificate may comprise an Extensible Authentication Protocol-Transport Layer Security certificate. The certificate 40 may be sent by itself, or with additional information, however, a password to the SSID 24 is not provided by the Ajax application 54, which is unaware of the password. The AP 14-1 receives the certificate 40 from the Ajax application 54 (step 2018). The AP 14-1 may process the certificate 40 to ensure that the format of the certificate 40 complies with certain criteria to ensure that the certificate 40 is a valid certificate. The AP 14-1 sends the certificate 40, or information extracted from the certificate 40, to the computing system 26 (step 2018). The computing system 26 examines the information and based on the information determines that the certificate is associated with the entity 36 and is a valid certificate (step 2020). The computing system 26 accesses the destination record 38-1 and extracts the authorized destinations. The computing system 26 generates a time-limited token 60 identifying an amount of time after which the time-limited connection with the computing device 44 will expire, and includes permissible destination information identifying one or more destinations that the Ajax application is permitted to access via the AP 14-1. The computing system 26 sends the token 60 to the AP 14-1 (step 2022). It is noted that in some implementations the authorized destinations may be separate from the token 60.

Referring now to FIG. 3B, the AP 14-1 receives the token 60 and stores the token 60 in association with an identifier indicative of the Ajax application 54, such as a MAC address of the computing device 44 or some other identifier that will be present in messages received from the Ajax application 54 (step 2024). The AP 14-1 may also start a timer that has been set to expire at the end of the duration of time identified in the token 60.

The AP 14-1 sends information to the computing device 44 indicating that the AP 14-1 has established a connection with the computing device 44 (step 2026). The computing device 44 may then, via the AP 14-1, obtain appropriate DHCP information, such as an IP address, a subnet mask, information identifying the AP 14-1 as the default gateway router, and the like (step 2028).

The Ajax application 54 generates a message destined to a URL that resolves to the computing system 34 (step 2030). The AP 14-1 receives the message and accesses information that identifies the one or more destinations that the Ajax application 54 is permitted to access via the AP 14-1 (step 2032). In this example such information is stored in the token 60 and identifies the domain name of the computing system 34. The AP 14-1 determines that the token 60 has not expired, and that the message is destined for the domain name identified in the token 60, and thus that the message is destined for a permissible (e.g., authorized) destination (step 2034). The AP 14-1 sends the message toward the identified URL (step 2036). The term "toward" in this context means that the AP 14-1 sends the message to the next router in a path of routers between the AP 14-1 and the computing system 34.

The Ajax application 54 and the computing system 34 may engage in one or more communications (step 2038). Each message received by the AP 14-1 from the Ajax application 54 is be examined to ensure that the destination is a permissible destination. If the AP 14-1 receives a message from the Ajax application 54, or any other application of the computing device 44 that has a destination that is not permissible (e.g., in this example a destination other than the domain name of the computing system 34), the AP 14-1 will ignore the message and not send the message toward the destination. It is noted that while the authorized destination discussed herein is a domain name, the invention is not limited to any particular format for identifying the one or more permissible destinations, and can include any other suitable mechanism for identifying permissible destinations, such as IP addresses, or the like.

At some point in time the AP 14-1 determines that the amount of time identified in the token 60 has passed and thus that the token 60 has expired. For example, a time set by the AP 14-1 for the duration of time may have expired. In response, the AP 14-1 deletes the token 60 and terminates the connection with the AP 14-1.

Figure 4:
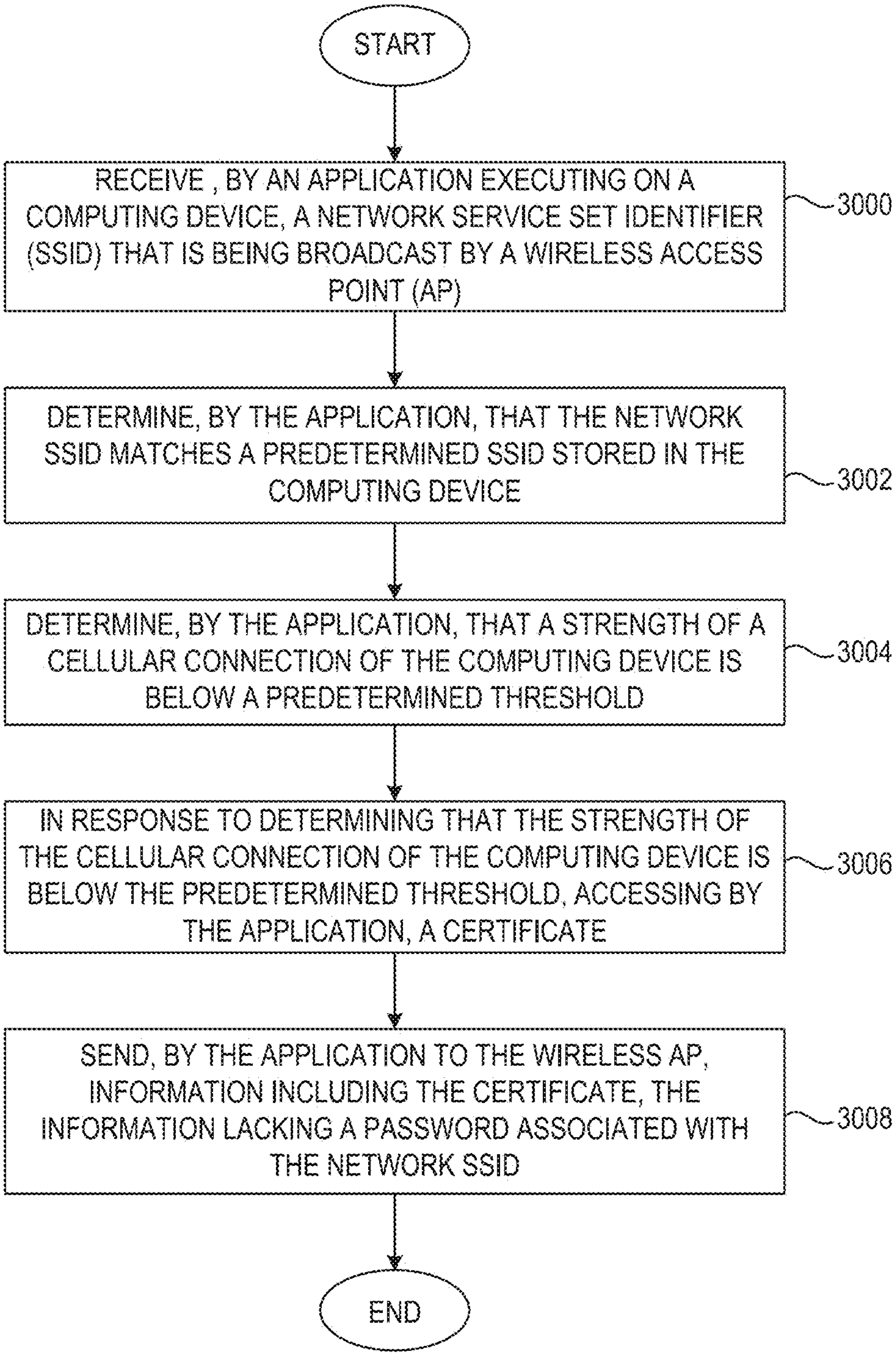
FIG. 4 is a flowchart of a method for implementing time-limited wireless access point connectivity to limited destinations in response to limited cellular service from the perspective of a user computing device according to some implementations.

FIG. 4 is a flowchart of a method for implementing time-limited wireless access point connectivity to limited destinations in response to limited cellular service from the perspective of the computing device 44 according to some implementations. FIG. 4 will be discussed in conjunction with FIG. 1. The Ajax application 54, executing on the computing device 44, receives the SSID 24 that is being broadcast by the AP 14-1 (FIG. 4, block 3000). The Ajax application 54 determines that the network SSID 24 matches the predetermined SSID 56 stored in the computing device 44 (FIG. 4, block 3002). The Ajax application 54 determines that a strength of a cellular connection of the computing device 44 is below the predetermined threshold 58 (FIG. 4, block 3004). The Ajax application 54, in response to determining that the strength of the cellular connection of the computing device 44 is below the predetermined threshold 58, accesses the certificate 40 (FIG. 4, block 3006). The Ajax application 54 sends, to the AP 14-1, information including the certificate 40, the information lacking a password associated with the network SSID 24 (FIG. 4, block 3008).

Figure 5:
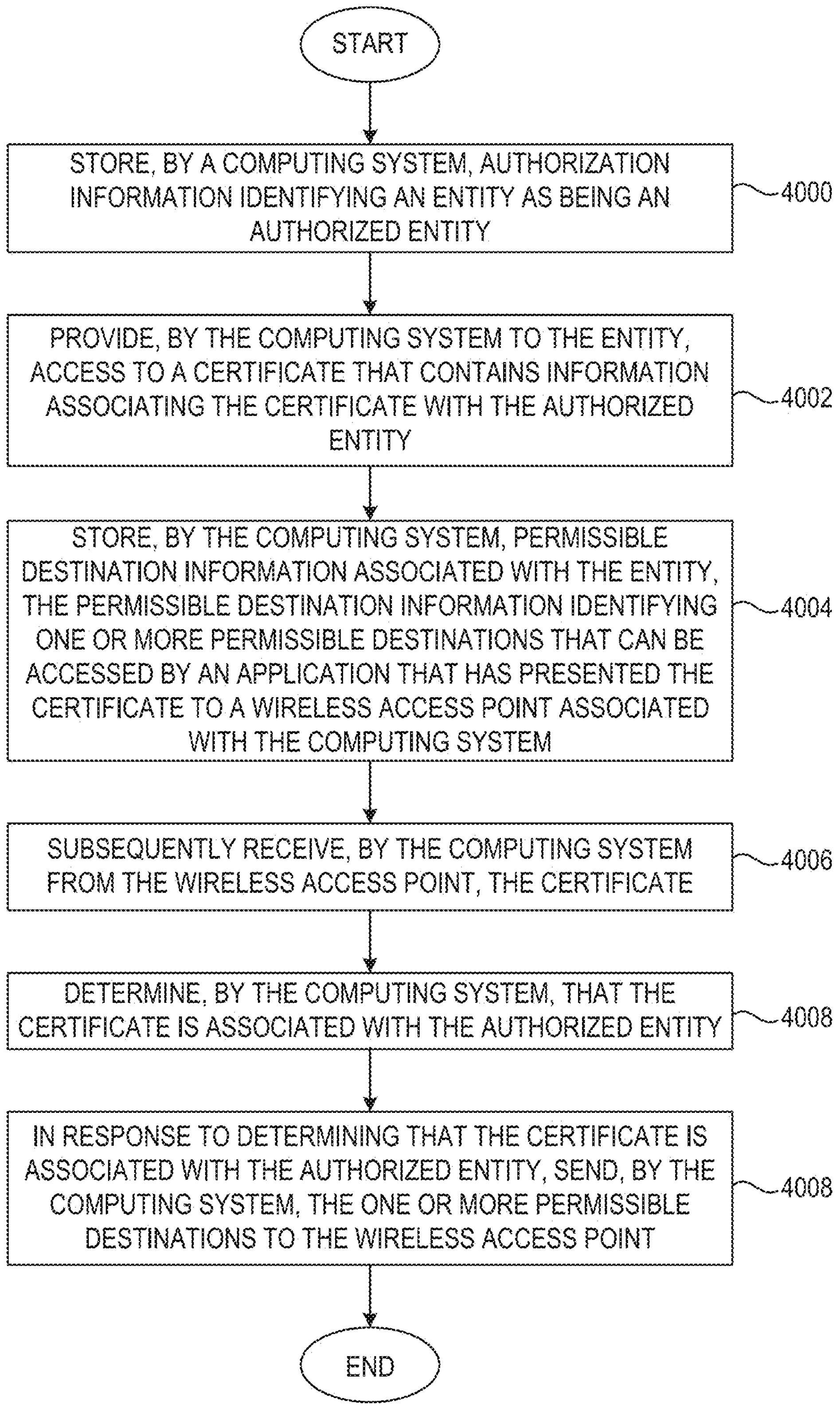
FIG. 5 is a flowchart of a method for implementing time-limited wireless access point connectivity to limited destinations in response to limited cellular service from the perspective of a computing system according to some implementations.

FIG. 5 is a flowchart of a method for implementing time-limited wireless access point connectivity to limited destinations in response to limited cellular service from the perspective of the computing system 26 according to some implementations. FIG. 5 will be discussed in conjunction with FIG. 1.

The computing system 26 stores authorization information in the list 39 of authorized entities identifying the entity 36 as being an authorized entity (FIG. 5, block 4000). The computing system 26 provides, to the entity 36, access to the certificate 40 that contains information associating the certificate 40 with the authorized entity 36 (FIG. 5, block 4002). The computing system 26 stores the permissible destination information associated with the entity 36 in the destination record 38-1, the permissible destination information identifying one or more permissible destinations that can be accessed by an application that has presented the certificate 40 to an AP 14 associated with the computing system 26 (FIG. 5, block 4004). The computing system 26 subsequently receives, from the AP 14, the certificate 40 (FIG. 5, block 4006). The computing system 26 determines that the certificate 40 is associated with the authorized entity 36 (FIG. 5, block 4008). The computing system 26, in response to determining that the certificate 40 is associated with the authorized entity 36, sends the one or more permissible destinations to the AP 14-1 (FIG. 5, block 4010).

Figure 6:
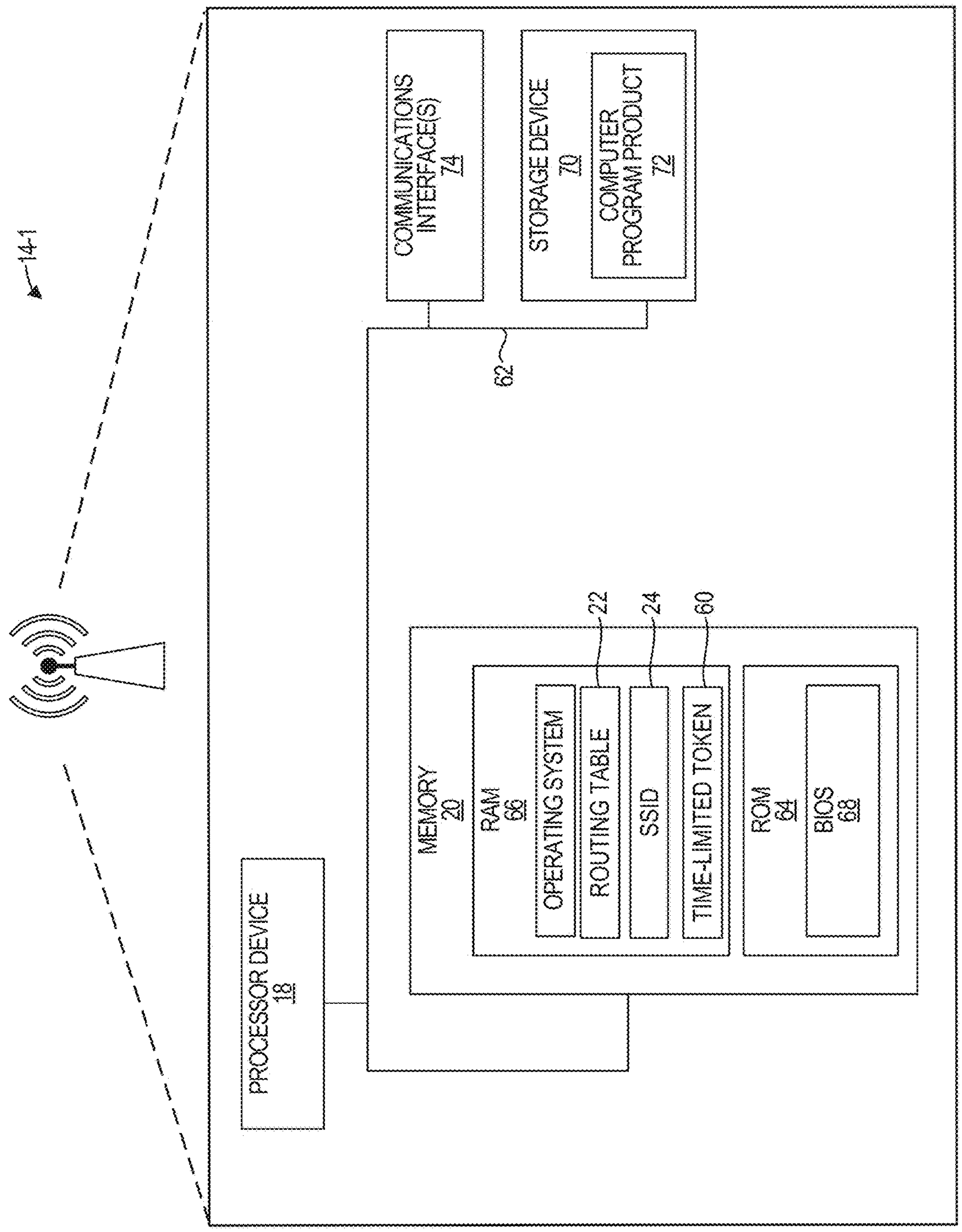
FIG. 6 is a block diagram of a wireless access point suitable for implementing aspects of time-limited wireless access point connectivity to limited destinations in response to limited cellular service according to some implementations.

FIG. 6 is a block diagram of the AP 14-1 suitable for implementing examples according to one example. The AP 14-1 may comprise any wireless access point or wireless router or combination thereof capable of including firmware, hardware, and/or executing software instructions to implement the functionality described herein. The AP 14-1 includes the processor device 18, the system memory 20, and a system bus 62. The system bus 62 provides an interface for system components including, but not limited to, the system memory 20 and the processor device 18. The processor device 18 can be any commercially available or proprietary processor device.

The system bus 62 may be any of several types of bus structures that may further interconnect to a memory bus (with or without a memory controller), a peripheral bus, and/or a local bus using any of a variety of commercially available bus architectures. The system memory 20 may include non-volatile memory 64 (e.g., read-only memory (ROM), erasable programmable read-only memory (EPROM), electrically erasable programmable read-only memory (EEPROM), etc.), and volatile memory 66 (e.g., random-access memory (RAM)). A basic input/output system (BIOS) 68 may be stored in the non-volatile memory 64 and can include the basic routines that help to transfer information between elements within the AP 14-1. The volatile memory 66 may also include a high-speed RAM, such as static RAM, for caching data.

The AP 14-1 may further include or be coupled to a non-transitory computer-readable storage medium such as a storage device 70, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 70 and other drives associated with computer-readable media and computer-usable media may provide non-volatile storage of data, data structures, computer-executable instructions, and the like.

All or a portion of the functionality described herein may be implemented as a computer program product 72 stored on a transitory or non-transitory computer-usable or computer-readable storage medium, such as the storage device 70, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18.

The AP 14-1 may also include one or more communications interfaces 74 suitable for communicating with computing devices via wireless signals in accordance with an IEEE 802.11X standard, and with non-wireless devices, such as the computing device 28 via the network 12 as appropriate or desired.

Figure 7:
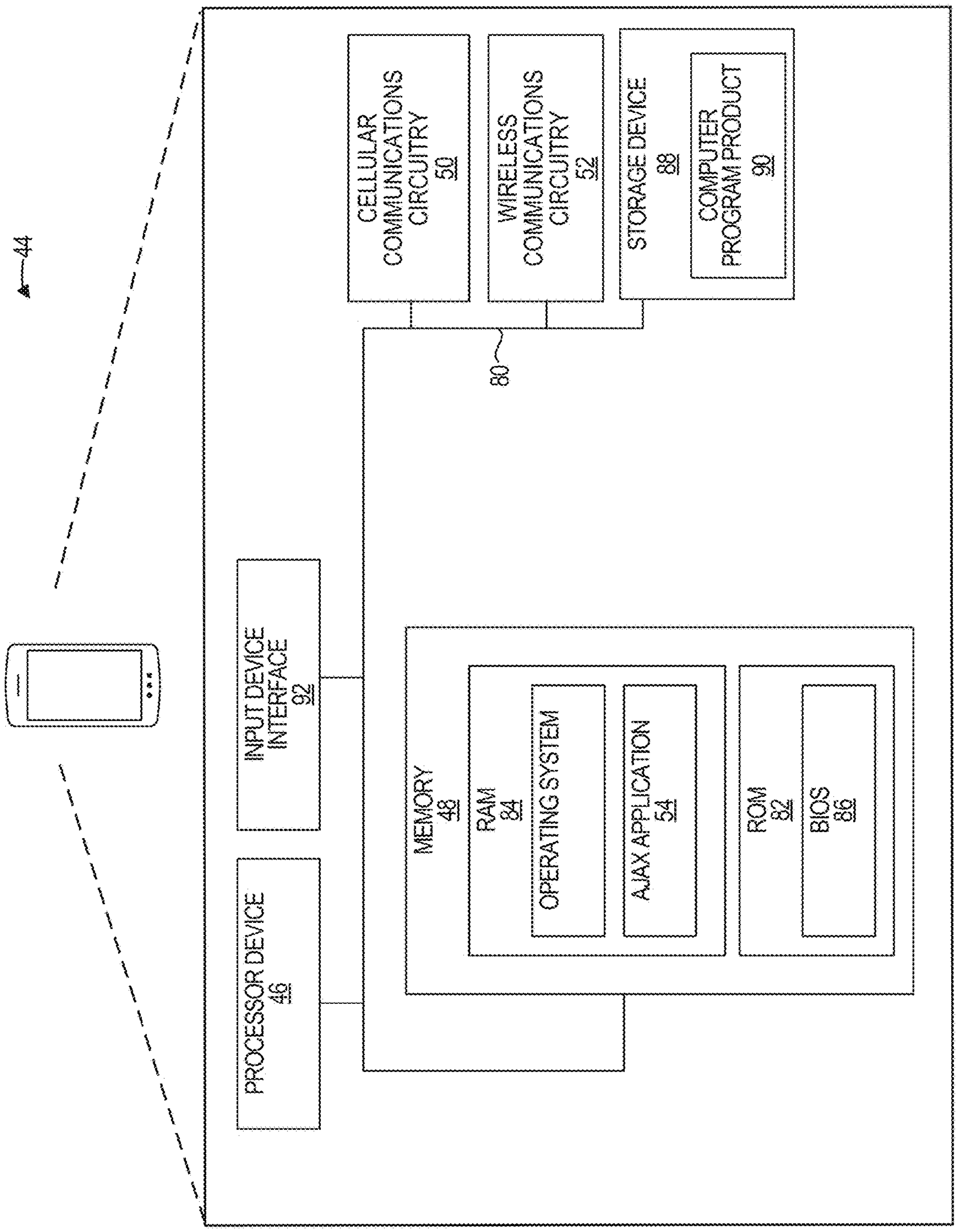
FIG. 7 is a block diagram of a user computing device suitable for implementing aspects of time-limited wireless access point connectivity to limited destinations in response to limited cellular service according to some implementations.

FIG. 7 is a block diagram of the computing device 44 suitable for implementing examples according to one example. The computing device 44 may comprise any computing or electronic device capable of including firmware, hardware, and/or executing software instructions to implement the functionality described herein, such as a smartphone, a computing tablet, a laptop computer, or the like. The computing device 44 includes the processor device 46, the system memory 48, and a system bus 80. The system bus 80 provides an interface for system components including, but not limited to, the system memory 48 and the processor device 46. The processor device 46 can be any commercially available or proprietary processor device.

The system bus 80 may be any of several types of bus structures that may further interconnect to a memory bus (with or without a memory controller), a peripheral bus, and/or a local bus using any of a variety of commercially available bus architectures. The system memory 48 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the computing device 44. The volatile memory 84 may also include a high-speed RAM, such as static RAM, for caching data.

The computing device 44 may further include or be coupled to a non-transitory computer-readable storage medium such as a storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like.

A number of modules can be stored in the storage device 88 and in the volatile memory 84, including an operating system and one or more program modules, such as the Ajax application 54, which may implement the functionality described herein in whole or in part. All or a portion of the examples may be implemented as a computer program product 90 stored on a transitory or non-transitory computer-usable or computer-readable storage medium, such as the storage device 88, which includes complex programming instructions, such as complex computer-readable program code, to cause the processor device 46 to carry out the steps described herein. Thus, the computer-readable program code can comprise software instructions for implementing the functionality of the examples described herein when executed on the processor device 46. The processor device 46, in conjunction with the Ajax application 54 in the volatile memory 84, may serve as a controller, or control system, for the computing device 44 that is to implement the functionality described herein.

An operator, such as the user 42, may also be able to enter one or more configuration commands through a keyboard (not illustrated), a pointing device such as a mouse (not illustrated), or a touch-sensitive surface such as a display device. Such input devices may be connected to the processor device 46 through an input device interface 92 that is coupled to the system bus 80 but can be connected by other interfaces such as a parallel port, an Institute of Electrical and Electronic Engineers (IEEE) 1394 serial port, a Universal Serial Bus (USB) port, an IR interface, and the like. The computing device 44 may also include the cellular communications circuitry 50 that is operable to communicate via cellular signals, such as, by way of non-limiting example, 3G, 4G or 5G cellular signals, and wireless communications circuitry 52 that is operable to communicate via wireless signals, such as those compliant with an IEEE 802.11x standard (e.g., Wi-Fi®).

Figure 8:
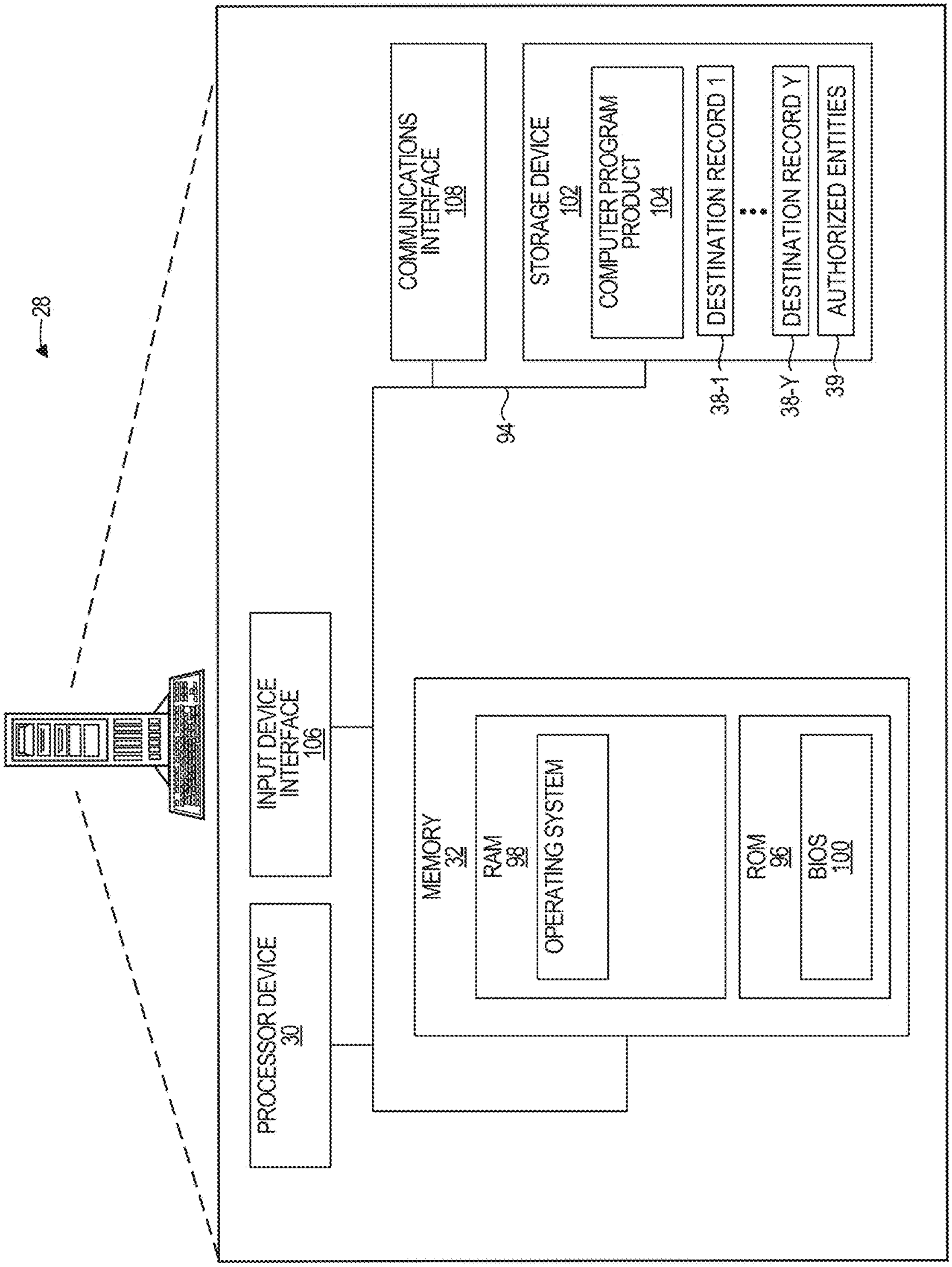
FIG. 8 is a block diagram of a computing device suitable for implementing aspects of time-limited wireless access point connectivity to limited destinations in response to limited cellular service according to some implementations.

FIG. 8 is a block diagram of the computing device 28 suitable for implementing examples according to one example. The computing device 28 may comprise any computing or electronic device capable of including firmware, hardware, and/or executing software instructions to implement the functionality described herein, such as a computer server or the like. The computing device 28 includes the processor device 30, the system memory 32, and a system bus 94. The system bus 94 provides an interface for system components including, but not limited to, the system memory 32 and the processor device 30. The processor device 30 can be any commercially available or proprietary processor.

The system bus 94 may be any of several types of bus structures that may further interconnect to a memory bus (with or without a memory controller), a peripheral bus, and/or a local bus using any of a variety of commercially available bus architectures. The system memory 32 may include non-volatile memory 96 (e.g., read-only memory (ROM), erasable programmable read-only memory (EPROM), electrically erasable programmable read-only memory (EEPROM), etc.), and volatile memory 98 (e.g., random-access memory (RAM)). A basic input/output system (BIOS) 100 may be stored in the non-volatile memory 96 and can include the basic routines that help to transfer information between elements within the computing device 28. The volatile memory 98 may also include a high-speed RAM, such as static RAM, for caching data.

The computing device 28 may further include or be coupled to a non-transitory computer-readable storage medium such as a storage device 102, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 102 and other drives associated with computer-readable media and computer-usable media may provide non-volatile storage of data, data structures, computer-executable instructions, and the like.

All or a portion of the examples may be implemented as a computer program product 104 stored on a transitory or non-transitory computer-usable or computer-readable storage medium, such as the storage device 102, which includes complex programming instructions, such as complex computer-readable program code, to cause the processor device 30 to carry out the steps described herein. Thus, the computer-readable program code can comprise software instructions for implementing the functionality of the examples described herein when executed on the processor device 30.

An operator may also be able to enter one or more configuration commands through a keyboard (not illustrated), a pointing device such as a mouse (not illustrated), or a touch-sensitive surface such as a display device. Such input devices may be connected to the processor device 30 through an input device interface 106 that is coupled to the system bus 94 but can be connected by other interfaces such as a parallel port, an Institute of Electrical and Electronic Engineers (IEEE) 1394 serial port, a Universal Serial Bus (USB) port, an IR interface, and the like. The computing device 28 may also include a communications interface 108 suitable for communicating with the network 12 as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a wireless access point (AP), a certificate from an application executing on a computing device that has not connected to the wireless AP, wherein the certificate does not include a password to a service set identifier (SSID) that is broadcast by the wireless AP;

determining, by the wireless AP, that the certificate is associated with an entity that is an authorized entity; and in response to determining, by the wireless AP, that the certificate is associated with the entity that is the authorized entity, establishing, by the wireless AP, a time-limited connection with the computing device.

2. The method of claim 1, further comprising:

obtaining, by the wireless AP, information which includes a time-limited token identifying an amount of time before the time-limited connection will expire, and permissible destination information identifying one or more destinations that the application is permitted to access via the wireless AP; and storing, by the wireless AP, the information in association with an identifier indicative of the application.

3. The method of claim 2, further comprising:

subsequent to obtaining the information, receiving, by the wireless AP from the application a message destined for a uniform resource locator (URL);

accessing, by the wireless AP, the permissible destination information identifying the one or more destinations that the application is permitted to access via the wireless AP; and responsive to determining, by the wireless AP, that the URL is a destination that the application is permitted to access via the wireless AP, sending, by the wireless AP, the message toward the URL.

4. The method of claim 2, further comprising:

subsequent to obtaining the permissible destination information, receiving, by the wireless AP from the application a message destined for a URL;

accessing, by the wireless AP, the permissible destination information identifying the one or more destinations that the application is permitted to access via the wireless AP; and responsive to determining, by the wireless AP, that the URL is not a destination that the application is permitted to access via the wireless AP, inhibiting sending, by the wireless AP, the message toward the URL.

5. The method of claim 2, further comprising:

responsive to determining, by the wireless AP, that the amount of time has passed, deleting, by the wireless AP, the time-limited token.

6. The method of claim 2, further comprising:

responsive to determining, by the wireless AP, that the amount of time has passed, terminating, by the wireless AP, the time-limited connection with the computing device.

7. The method of claim 1, wherein the certificate comprises an Extensible Authentication Protocol-Transport Layer Security certificate.

8. The method of claim 1, wherein determining, by the wireless AP, that the certificate is associated with the entity that is the authorized entity comprises:

sending, by the wireless AP to a computing system, information contained in the certificate; and receiving, by the wireless AP from the computing system, information indicating that the certificate is associated with the entity that is the authorized entity.

9. The method of claim 8, further comprising:

prior to sending, by the wireless AP to the computing system, the information contained in the certificate, determining, by the wireless AP, that the certificate is a valid certificate; and wherein sending, by the wireless AP to the computing system, the information contained in the certificate is responsive to determining that the certificate is a valid certificate.

10. A method, comprising:

receiving, by an application executing on a computing device, a network service set identifier (SSID) that is being broadcast by a wireless access point (AP);

determining, by the application, that the network SSID matches a predetermined SSID stored in the computing device;

determining, by the application, that a strength of a cellular connection of the computing device is below a predetermined threshold;

in response to determining that the strength of the cellular connection of the computing device is below the predetermined threshold, accessing by the application, a certificate; and sending, by the application to the wireless AP, information including the certificate, the information lacking a password associated with the network SSID.

11. The method of claim 10, further comprising:

prior to sending the information to the wireless AP, presenting, by the application on a display device of the computing device, a request for authorization to connect to the wireless AP; and receiving, by the application, user input that authorizes connection to the wireless AP.

12. A wireless access point, comprising:

a memory; and a processor device coupled to the memory and operable to:

receive a certificate from an application executing on a computing device that has not connected to the wireless AP, wherein the certificate does not include a password to a service set identifier (SSID) that is broadcast by the wireless AP;

determine that the certificate is associated with an entity that is an authorized entity; and in response to determining that the certificate is associated with the entity that is the authorized entity, establish a time-limited connection with the computing device.

13. The wireless access point of claim 12, wherein the processor device is further operable to:

obtain information which includes a time-limited token identifying an amount of time before the time-limited connection will expire, and permissible destination information identifying one or more destinations that the application is permitted to access via the wireless AP; and store the information in association with an identifier indicative of the application.

14. The wireless access point of claim 13, wherein the processor device is further operable to:

subsequent to obtaining the information, receive, from the application a message destined for a uniform resource locator (URL);

access the permissible destination information identifying the one or more destinations that the application is permitted to access via the wireless AP; and responsive to determining that the URL is a destination that the application is permitted to access via the wireless AP, send the message toward the URL.

15. The wireless access point of claim 13, wherein the processor device is further operable to:

subsequent to obtaining the permissible destination information, receive, from the application a message destined for a URL;

access the permissible destination information identifying the one or more destinations that the application is permitted to access via the wireless AP; and responsive to determining that the URL is not a destination that the application is permitted to access via the wireless AP, inhibit sending the message toward the URL.

16. The wireless access point of claim 13, wherein the processor device is further operable to:

responsive to determining that the amount of time has passed, delete the time-limited token.

17. The wireless access point of claim 13, wherein the processor device is further operable to responsive to determining that the amount of time has passed, terminate the time-limited connection with the computing device.

18. The wireless access point of claim 12, wherein to determine that the certificate is associated with the entity that is the authorized entity, the processor device is further operable to:

send, to a computing system, information contained in the certificate; and receive, from the computing system, information indicating that the certificate is associated with the entity that is the authorized entity.

19. The wireless access point of claim 18, wherein the processor device is further operable to:

prior to sending, to the computing system, the information contained in the certificate, determine that the certificate is a valid certificate; and wherein to send to the computing system, the information contained in the certificate is responsive to determining that the certificate is a valid certificate.

20. The wireless access point of claim 12, wherein the certificate comprises an Extensible Authentication Protocol-Transport Layer Security certificate.

21. A non-transitory computer-readable storage medium that includes executable instructions configured to cause one or more processor devices of a wireless access point (AP) to:

receive a certificate from an application executing on a computing device that has not connected to the AP, wherein the certificate does not include a password to a service set identifier (SSID) that is broadcast by the wireless AP;

determine that the certificate is associated with an entity that is an authorized entity; and in response to determining that the certificate is associated with the entity that is the authorized entity, establish a time-limited connection with the computing device.

22. A computing device, comprising:

a memory; and a processor device coupled to the memory and operable to execute an application to:

receive a network service set identifier (SSID) that is being broadcast by a wireless access point (AP);

determine that the network SSID matches a predetermined SSID stored in the computing device;

determine that a strength of a cellular connection of the computing device is below a predetermined threshold;

in response to determining that the strength of the cellular connection of the computing device is below the predetermined threshold, access a certificate; and send, to the wireless AP, information including the certificate, the information lacking a password associated with the network SSID.

23. A non-transitory computer-readable storage medium that includes executable instructions configured to cause one or more processor devices to execute an application to:

receive a network service set identifier (SSID) that is being broadcast by a wireless access point (AP);

determine that the network SSID matches a predetermined SSID stored in a computing device;

determine that a strength of a cellular connection of the computing device is below a predetermined threshold;

in response to determining that the strength of the cellular connection of the computing device is below the predetermined threshold, access a certificate; and send, to the wireless AP, information including the certificate, the information lacking a password associated with the network SSID.

* * * * *